US012615610B2

(12) United States Patent
Nayak et al.

(10) Patent No.: US 12,615,610 B2
(45) Date of Patent: Apr. 28, 2026

(54) METHOD AND APPARATUS FOR NETWORK SLICE ACCESS MANAGEMENT FOR A USER EQUIPMENT IN A WIRELESS COMMUNICATION SYSTEM

(71) Applicant: Samsung Electronics Co., Ltd., Gyeonggi-do (KR)

(72) Inventors: Ashok Kumar Nayak, Bangalore (IN); Lalith Kumar, Bangalore (IN); Danish Ehsan Hashmi, Bangalore (IN)

(73) Assignee: Samsung Electronics Co., Ltd (KR)

( * ) Notice: Subject to any disclaimer, the term of this patent is extended or adjusted under 35 U.S.C. 154(b) by 233 days.

(21) Appl. No.: 18/544,851

(22) Filed: Dec. 19, 2023

(65) Prior Publication Data

US 2024/0205867 A1      Jun. 20, 2024

(30) Foreign Application Priority Data

Dec. 19, 2022    (IN) .............................. 202241073668

(51) Int. Cl.
*H04Q 7/00*      (2006.01)
*H04W 48/16*      (2009.01)
*H04W 60/04*      (2009.01)

(52) U.S. Cl.
CPC ........... *H04W 60/04* (2013.01); *H04W 48/16* (2013.01)

(58) Field of Classification Search
CPC ... H04W 60/04; H04W 60/002; H04W 48/16; H04W 72/535; H04W 88/02; H04W 88/18
See application file for complete search history.

(56) References Cited

U.S. PATENT DOCUMENTS

| | | |
|---|---|---|
| 2020/0413244 A1 | 12/2020 | Park et al. |
| 2021/0258836 A1 | 8/2021 | Faccin et al. |
| 2021/0289340 A1 | 9/2021 | Lee et al. |
| 2021/0289351 A1 | 9/2021 | Ferdi et al. |
| 2022/0232507 A1 | 7/2022 | Kim et al. |
| 2023/0138108 A1* | 5/2023 | Mysore Viswanath ...................... H04W 48/18 455/435.1 |

(Continued)

OTHER PUBLICATIONS

Protocol for 5G System (5GS); Stage 3; (Release 18), Sep. 2022, 1007 pages.

(Continued)

*Primary Examiner* — Tuan Pham
(74) *Attorney, Agent, or Firm* — The Farrell Law Firm, P.C.

(57)      ABSTRACT

The disclosure relates to a 5G or 6G communication system for supporting a higher data transmission rate. Specifically, the disclosure related to method and apparatus for a network slice access management for a user equipment in a wireless communication system. The method includes receiving, from an access and mobility management function (AMF) entity, temporary slice related information for a first single network slice selection assistance information (S-NSSAI). Further, the method includes identifying whether the first S-NSSAI is available or not available. Further, the method includes transmitting, to the AMF entity, a registration request message including a second S-NSSAI based on the identification. Further, the registration request message does not include the first S-NSSAI.

15 Claims, 8 Drawing Sheets

(56)            References Cited

U.S. PATENT DOCUMENTS

2023/0276351 A1 *   8/2023  Tamura ................ H04W 48/18
                                                        455/435.2
2024/0365220 A1 *  10/2024  Bulakci ................ H04W 48/18

OTHER PUBLICATIONS

International Search Report dated Mar. 28, 2024 issued in counterpart application No. PCT/KR2023/020979, 12 pages.
LG Electronics, "Clarifications on Rejected S-NSSAIs", C1-180259, 3GPP TSG-CT WG1 Meeting #108, Jan. 22-26, 2018, 9 pages.
Qualcomm Incorporated, "KI#3, KI#5, Sol#11: Updates to remove ENs and Clarify Functionality", S2-2203940, 3GPP TSG-SA WG2#151E e-meting, May 16-20, 2022, 4 pages.
European Search Report dated Jan. 29, 2026 issued in counterpart application No. 23907685.4-1206, 13 pages.

* cited by examiner

600

| Send a request for registering with a set of slices over a first network access type to a network node | ~ 602 |

| Receive a policy related to a temporary slice among the set of slices | ~ 604 |

| Prevent transmission of a new request to the network node for availing the service for the temporary slice over any of the first network access type and a second access type | ~ 606 |

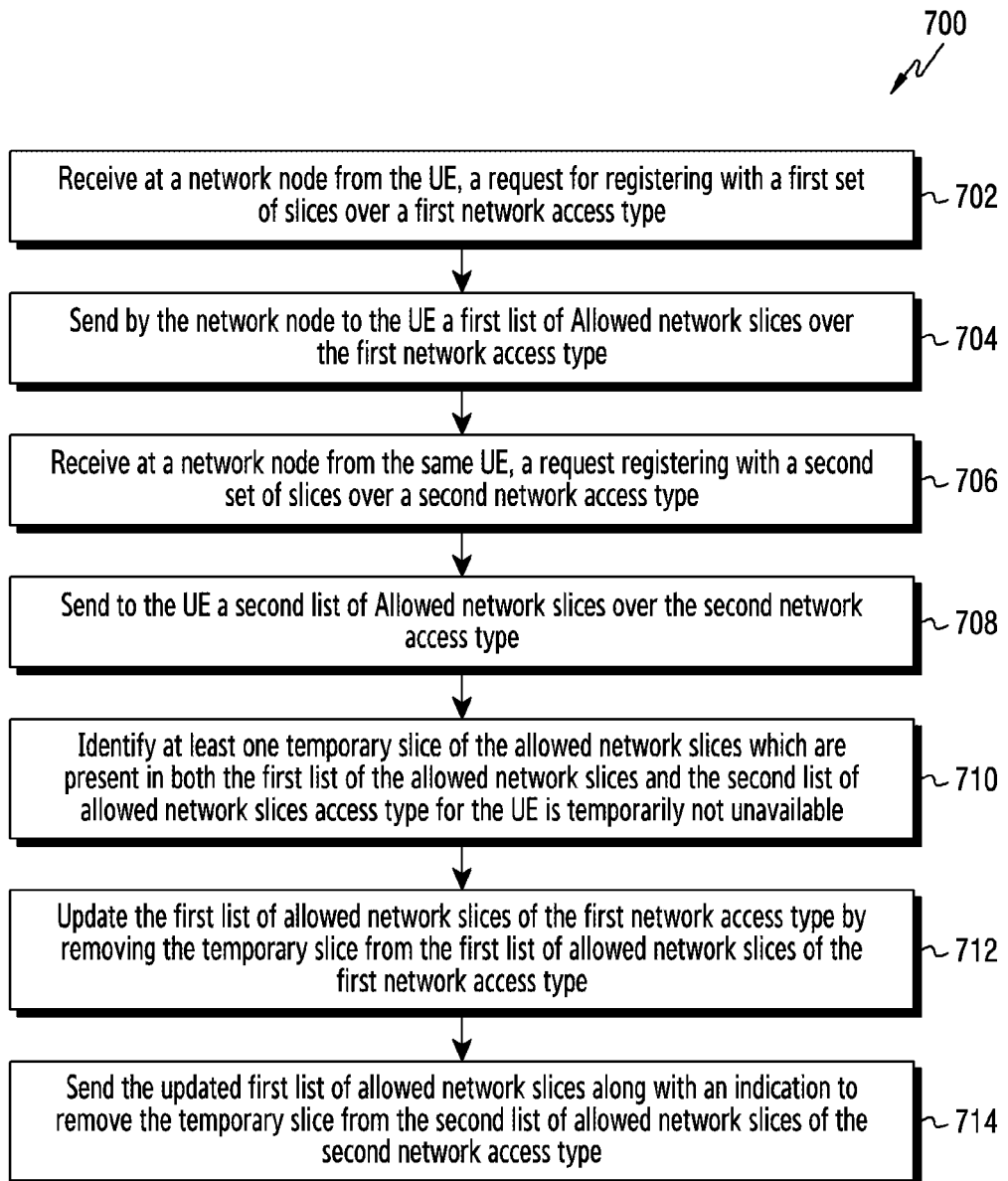

700

Receive at a network node from the UE, a request for registering with a first set of slices over a first network access type ~702

Send by the network node to the UE a first list of Allowed network slices over the first network access type ~704

Receive at a network node from the same UE, a request registering with a second set of slices over a second network access type ~706

Send to the UE a second list of Allowed network slices over the second network access type ~708

Identify at least one temporary slice of the allowed network slices which are present in both the first list of the allowed network slices and the second list of allowed network slices access type for the UE is temporarily not unavailable ~710

Update the first list of allowed network slices of the first network access type by removing the temporary slice from the first list of allowed network slices of the first network access type ~712

Send the updated first list of allowed network slices along with an indication to remove the temporary slice from the second list of allowed network slices of the second network access type ~714

FIG.7

METHOD AND APPARATUS FOR NETWORK SLICE ACCESS MANAGEMENT FOR A USER EQUIPMENT IN A WIRELESS COMMUNICATION SYSTEM

CROSS-REFERENCE TO RELATED APPLICATION(S)

This application is based on and claims priority under 35 U.S.C. § 119(a) to Indian Provisional Patent Application No. 202241073668, which was filed with the Indian Intellectual Property Office on Dec. 19, 2022, and to Indian Complete Patent Application No. 202241073668, which was filed in the Indian Intellectual Property Office on Dec. 4, 2023, the entire disclosure of each of which is incorporated herein by reference.

BACKGROUND

1. Field

The present disclosure relates generally to the field of network slicing, and more particularly, to a network slice access management for a user equipment (UE) in a wireless communication system.

2. Description of the Related Art 5G mobile communication technologies define broad frequency bands such that high transmission rates and new services are possible, and can be implemented not only in "sub 6 GHz" bands such as 3.5 GHz, but also in "above 6 GHz" bands referred to as mmWave including 28 GHz and 39 GHz. In addition, it has been considered to implement 6G mobile communication technologies (referred to as beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple in multiple out (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting-beam transmission and broadbands, definition and operation of BWP (bandwidth part), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The present disclosure generally relates to wireless communication systems and, more particularly, to a method of network slice access management for a user equipment (UE) capable of supporting temporarily available network slices.

According to an embodiment, a method includes sending, by a UE, a request for registering with a set of slices over a first network access type to a network node. The method further includes receiving, by the UE from the network node, a policy related to a temporary slice among the set of slices, and preventing, by the UE, transmission of a new request to the network node for availing service for the temporary slice over any of the first network access type and a second access type.

According to an embodiment, a method of network slice access management for a user equipment (UE) incapable of supporting temporarily available network slices is disclosed. The method includes receiving, at a network node from the UE, a request for registering with a first set of slices over a first network access type, sending by the network node to the UE the first list of allowed network slices over the first network access type, receiving, at a network node from the same UE, a request registering with a second set of slices over a second network access type. The network node may send the second list of allowed network slices over the second network access type. The method further includes identifying by the network node at least one temporary slice present in both the first list of the allowed network slices and the second list of allowed network slices for the UE is temporarily unavailable, updating, by the network node, a first list of allowed network slices of the first network access type by removing the temporary slice from the first list of allowed network slices of the first network access type, and sending, by the network node to the UE, the updated first list of allowed network slices along with an indication to remove the temporary slice from the second list of allowed network slices of a second network access type.

According to an embodiment, a method of network slice access management for a user equipment (UE) incapable of supporting temporarily available network slices is disclosed. The method includes sending, by the UE, a request for registering with a first set of slices over a first network access type, receiving, by the UE, a first list of allowed network slices over the first network access type, sending, by the UE, a request registering with a second set of slices over a second network access type, receiving, by the UE, a second list of allowed network slices over the second network access type, receiving, by the UE from the network node, an updated first list of allowed network slices along with an indication to remove the temporary slice from the second list of allowed network slices of the second network access type, and updating, by the UE, the second list of allowed network slices of the second network access type to remove the temporary slice from the second list of allowed network slices of the second network access type in order to prevent transmission of a new request to the network node for availing service for the temporary slice over any of the first network access type and the second network access type.

According to an embodiment, a user equipment (UE) capable of supporting temporarily available network slices to manage network slice access, includes a transceiver and a processing unit communicatively coupled to the transceiver. The processing unit is configured to send, via the transceiver, a request for registering with a set of slices over a first network access type to a network node, receive, from the network node, a policy related to a temporary slice among the set of slices, and prevent transmission of a new request to the network node for availing service for the temporary slice over any of the first network access type and a second access type.

According to an embodiment, a network node to manage network slice access for user equipment (UE) incapable of supporting temporarily available network slices includes a transceiver and a processing unit communicatively coupled to the transceiver. The processing unit is configured to receive, via the transceiver, a request for registering with a first set of slices over a first network access type, send a first list of allowed network slices over the first network access type to the UE, receive a request by registering with a second set of slices over a second network access type and send a second list of allowed network slices over the second network access type to the UE, identify by the network node at least one temporary slice present in both the first list of the allowed network slices and the second list of allowed network slices for the UE is temporarily unavailable, update the first list of allowed network slices of the first network access type to remove the temporary slice from the first list of allowed network slices of the first network access type, and send, via the transceiver, the updated first list of allowed network slices to the UE along with an indication to remove the temporary slice from the second a list of allowed network slices of the second network access type.

According to an embodiment, a user equipment (UE) incapable of supporting temporarily available network slices to manage network slice access management includes a transceiver and a processing unit communicatively coupled to the transceiver. The processing unit is configured to send a request for registering with a first set of slices over a first network access type and receive a first list of allowed network slices over the first network access type, send a request registering with a second set of slices over a second network access type and receive a second list of allowed network slices over the second network access type, receive an updated first list of allowed network slices along with an indication to remove the temporary slice from a second list of allowed network slices of a second network access type, and update second the list of allowed network slices of the second network access type to remove the temporary slice from second the list of allowed network slices of the second network access type in order to prevent transmission of a new request to the network node for availing the service for the temporary slice over any of the first network access type and the second network access type.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 illustrates a method of network slice access management for a user equipment (UE) incapable of supporting temporarily available network slices, in accordance with an embodiment.

DETAILED DESCRIPTION

Figure 1:
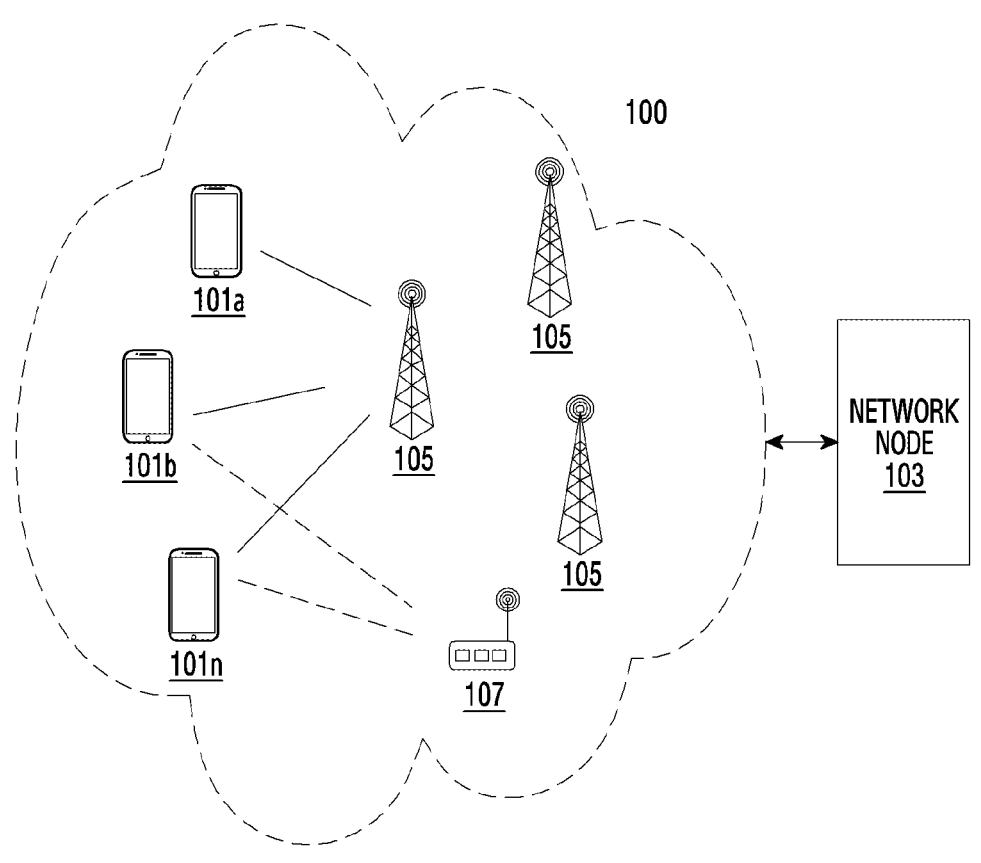
FIG. 1 illustrates an environment for managing network slice access for a user equipment (UE), in accordance with an embodiment.

It should be appreciated by those skilled in the art that any block diagrams herein represent conceptual views of the illustrative systems embodying the principles of the present subject matter. Similarly, it will be appreciated that any flowchart, flow diagrams, state transition diagrams, pseudo code, and the like represent various processes which may be substantially represented in computer readable medium and executed by a computer or processor, whether or not such computer or processor is explicitly shown.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof may be shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises," "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description, reference is made to the accompanying drawings that form a part hereof, and in which are shown by way of illustration specific embodiments in which the description may be practiced. These embodiments are described in sufficient detail to enable those skilled in art to practice the disclosure, and it is to be understood that other embodiments may be utilized and that changes may be made without departing from the scope of the present disclosure. The following description is, therefore, not to be taken in a limiting sense.

The terms like "at least one" and "one or more" may be used interchangeably throughout the description. The terms like "a plurality of" and "multiple" may be used interchangeably throughout the description. The terms like "access type" and "AT" may be used interchangeably throughout the description. The terms like "network" and "communication network" may be used interchangeably throughout the description.

Generally, network slicing allows telecom service providers to deploy an exclusive network for a customer (e.g., mobile virtual network operator (MVNO), enterprise) or service (e.g., enhanced mobile broadband (eMBB), ultra reliable low latency communications (URLLC), massive machine-type communications (mMTC)), consisting of multiple network functions designed specifically to support specialized service. This was introduced by 3rd Generation Partnership Project (3GPP) release 15. A set of such network slices is identified using single network slice selection assistance information (S-NSSAI) inside a 3GPP network. These slices are characterized by a set of both standard and proprietary attributes as defined by a "slice template." A global system for mobile communications association (GSMA) defines a "generic network slice template" (GST) which provides standardized slice attributes for a set of services supported by 3GPP.

Two of the attributes defined by GST are "number of terminals" and "number of sessions." The attribute "number of terminals" describes a maximum number of terminals (UEs) that can use the network slice simultaneously. Similarly, the attribute "number of sessions" describes a maximum number of protocol data unit (PDU) sessions that can use the network slice simultaneously. These are important inputs in network planning, as operators need to make sure that resources, they provide for the network slice are sufficient to handle the capacity specified by these attributes.

In an operation, when the operator deploys a particular slice (including slice instances) in the network, then the deployed particular slice follows the procedures, information and configuration as described in Technical Specification (TS) such as TS 23.501, TS 23.502, and TS 23.503.

The procedure may include access network (AN) selection and access and mobility management function (AMF) selection with help of network slicing selection function (NSSF) during registration. Further, session management function (SMF), policy control function (PCF), user plane function (UPF) selection during protocol data unit (PDU) session establishment. A network repository function (NRF) may be used for registration and discovery of the supported slices. The configuration such as network slice simultaneous registration group (NSSRG) and UE route selection policy (URSP) may be used. The aforementioned configurations and procedures are executed before a UE receives the required services for the specific slices. These slices are deployed permanently or temporarily by the operator. Further, to enhance the procedures for seamless handling of temporary slice management, the 3GPP release 18 TR 23.700-41 studied this temporary slice aspect and provided a solution in which the network provides the temporary slice information such as time and location and during this the UE will behave as the services of temporary slice won't be available.

The operator may deploy a plurality of network slices which may include a permanent network slice or the temporary slices. The UEs may avail the services of the permanent network slice or temporary slice by initially registering to the network. Generally, the UEs may get registered to both access type (AT), i.e., 3GPP or non-3GPP, and then avail different services. As specified in 3GPP TS 23.501 and TS 23.502 in release 17, when the UE is registered, a network slice access control function (NSACF) controls (i.e., increases or decreases) the number of UEs registered for the network slice so that it does not exceed a maximum number of UEs allowed to register with that network slice based on the request it receives from an AMF. The NSACF may count the number of registered UEs based on the access type information received from the AMF.

As described above, the operator may deploy the permanent network slice and the UE may request for the plurality of services associated with the permanent network slice. Further, the operator may deploy temporary slices for a certain duration on a particular location. The temporary slices are deployed to provide some specific events, such as, for example, the Olympics or FIFA World Cup and then it may be terminated upon expiration of a specified duration. However, in the 3GPP release 18, TR 23.700-41 studied the temporary slice aspect and provided a solution in which the network will provide the temporary slice information such as time and location and the UE will behave as such that during this the UE may avail the services only when the time and location criteria are matched with the time and location given by the network.

However, when the UE uses one of the ATs (for example, 3GPP) to get its first registration with the network and if the network provides temporary slice related validity criteria, and if the UE does not apply the same information to the other AT (non-3GPP) and start requesting the same temporary slice, then the network will not be able to provide that slice related service as the temporary slice is not available during that time or on that location. As a result, a radio and core network resources are completely wasted and in some cases the entire registration will fail if the UE requests only a temporary slice in the registration request. Thus, the present disclosure addresses the above-mentioned problems in an effort to overcome them.

FIG. 1 illustrates an exemplary environment 100 for managing network slice access for a user equipment (UE), in accordance with an embodiment. The present disclosure is applicable for network slice access management for a user equipment (UE) capable of supporting temporarily available network slices and when the UEs are incapable of supporting temporarily available network slices.

The environment 100 may include the UE 101a, a UE 101b, UE 101n (herein after referred as plurality of UEs 101), network node 103, 3GPP access node 105 and non-3GPP access node 107. The network node 103 may be in connection with a plurality of 3GPP access nodes 105 or the wireless network for communicating with each other and the network node 103 may be in connection with non-3GPP access node 107 as shown in FIG. 1. Further, the 3GPP access node 105 and non-3GPP access node 107 are connected to the plurality of UEs 101a, UE 101b, UE 101n. For instance, consider UE 101a to be capable of supporting temporarily available network slices and UE 101b is incapable of supporting temporarily available network slices. In other words, the present disclosure is applicable for both the UE addressing the timing information and the UE incapable of supporting temporarily available network slices. The plurality of UEs 101 may be connected to the network node 103 or the wireless network for communicating with each other. The plurality of UEs 101 may be any device used directly by an end-user for communication. The plurality of UEs 101 may include, but is not limited to, a mobile phone, a smart phone, and the like. In an embodiment, the network node 103 (an AMF which is one of the control plane network functions (NF) of the 5G core network may manage connection and mobility management of the plurality of UEs 101) may serve as a central connection point for the plurality of UEs for establishing communication. The network node 103 may be responsible for managing radio resources for cells, and for handling radio link protocols with the plurality of UEs 101.

As described above, the plurality of UEs may send a request to the network node 103 for registering with a set of slices over a network access type to avail one or more services. The one or more services may include, but is not limited to, a retail shipping application, gaming application, and the like. A network function of FIG. 1 may be a control function that manages user sessions including establishment, modification, and release of sessions in a 5G network.

Generally, the UE 101 (101a, 101b, . . . , 101n) may be registered with the network node 103 to receive plurality of services associated with the plurality of network slices. The network node 103 may receive a plurality of requests from the plurality of UEs 101 (101a, 101b, . . . , 101n) associated with the network node 103. The request from the UE is for registering with a set of slices such as a temporary slice or permanent slice. For instance, the set of slices are deployed to provide some specific events (for example, the Olympics or FIFA World Cup) and then may be terminated. In another example, the slice among the set of slices may be a slice which may not be available for certain time period or duration due to maintenance activities and the like. The network access type may be the first network access type and the second network that corresponds to the 3GPP access type and non-3GPP access type, respectively or vice versa. When the request is received at the network node 103, the network node 103 may send a policy related to a temporary slice among the set of slices. Based on the received policy, the UE may prevent the transmission of a new request to the network node 103 for availing the service for the temporary slice which may be independent of the first network access type and the second network access type.

In an alternative embodiment, the UE 101 sends a request for registering with the set of slices, the network node 103 may send a list of allowed network slices. Based on an updated list of allowed network slices indicating removal of a temporary slice that is temporarily unavailable in both access types shared by the network node 103, the UE 101 may prevent transmission of new requests to the network node 103. For instance, the UE may send requests for registering with the set of slices over 3 GPP and non-3GPP access types for which the UE may receive the list of allowed network slices independent of access types. Further, an updated list of allowed network slices may be received by the UE 101 based on which the UE 101 may remove the temporary slice that is temporarily unavailable for the UE 101 from the list of allowed network slices of both 3GPP and non-3GPP and prevent transmission of a new request to the network node 103. The terms "3GPP access type", "3GPP access node" and "non-3GPP access type", "non-3GPP access node" are interchangeably used in the present disclosure.

For instance, consider that the user associated with the UE 101 wishes to register for a set of slices for example FIFA World Cup which is the temporary slice. Further, the UE associated with the user may send the request to register for the set of service which may provide service of online streaming of FIFA World Cup. Based on the request from the UE, the network node 103 may send the policy associated with the temporary slice which is FIFA World Cup in this instance. The policy varies based on the set of slices for which the UE has requested for registering. The policy may be sent to the UE in order to prevent the transmission of a new request to the network node for availing the service for the temporary slice over either of network access types. The policy comprises information of at least one of time and location for the temporary slice. The time indicates a time duration for availability or unavailability of the temporary slice and the location indicates a coverage area serviced by the temporary slice.

Figure 2:
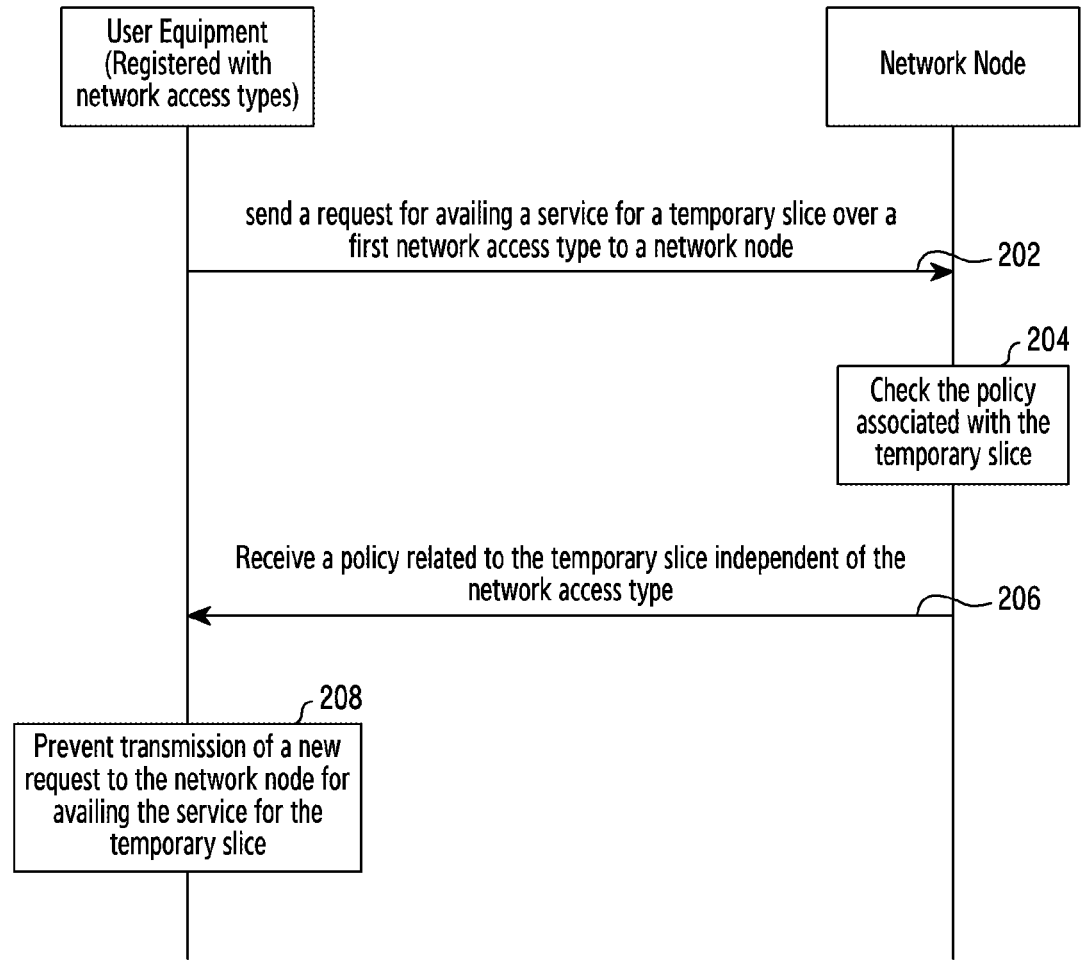
FIG. 2 illustrates a line diagram depicting a network slice access management for a user equipment (UE) capable of supporting temporarily available network slices, in accordance with the prior art.

FIG. 2 illustrates a line diagram depicting a network slice access management for a user equipment (UE) capable of supporting temporarily available network slices, in accordance with the prior art.

The UE 101 is registered over 3GPP access type (AT) and non-3GPP AT. Later, the UE may initiate a request to the network node for registering with a set of slices. As the UE 101 is registered with both 3GPP access type (AT) and non-3GPP AT, consider that the UE 101 has initiated a request for registering with a set of slices over a network access type to the network node 103. In other words, the UE may initiate a request for registering with a set of slices (availing the service for a temporary slice) over a first network access type which may be 3GPP as shown in step 202. At the network node end, when the UE 101 requests for availing the service is received, the network node may check for the policy associated with the temporary slice as shown in step 204. For example, the user wishes to avail the service of viewing a World Cup match which may be the temporary slice. In view of the above example, the World Cup may be hosted for two months, thus the temporary slice may be available for the period of two months. Thus, the network node 103 may send the policy related to the temporary slice which is independent of a network access type that is both 3GPP and non-3GPP as shown in step 206. The policy comprises information of at least one of time and location for the temporary slice. The time indicates a time duration for availability or unavailability of the temporary slice and the location indicates a coverage area serviced by the temporary slice. For instance, the time duration may indicate that temporary slice is available for 2 months from 1 Apr. 2022 to 1 Jun. 2022.

In an alternative embodiment, when the user wishes to avail the service of viewing an online tutorial for which he has a subscription, in such scenarios the user may request registering with the set of slices for viewing the online tutorial. Based on the request received, the network node 103 may send the policy related to the temporary slice (video tutorial) according to this example. The policy may indicate a time duration for availability or unavailability of the temporary slice and the location indicates a coverage area serviced by the temporary slice. For example, the temporary slice may not be available between 2-3 PM on Jan. 2, 2021 due maintenance activity or may indicate the downtime of the temporary slice. Based on the received policy of the temporary slice, the UE may prevent transmission of a new request to the network node 103 for availing the service for the temporary slice over any of the first network access type and a second network access type. In other words, the policy of the temporary slice indicates the time duration for availability or unavailability of temporary slice as shown in step 208. Thus, the UE 101 may not send the new request for accessing the service from the network node 103. For instance, if the UE 101 has sent the request for registering with the set of slices over 3GPP access type to the network node 103, the UE 101 may not send the request for registering with the set of slices over non-3GPP to the network node 103 as the policy of the temporary slice is applicable for both the access types. As the UE 101 is aware that the temporary slice is unavailable over both 3GPP and non-3GPP, the UE 101 may not send continuous requests for availing or for registering with the set of slices. In other words, as the UE 101 may be informed whether the temporary slice is available or unavailable based on the availability or unavailability of the temporary slices, the UE 101 may send the request when the temporary slice is available and avoid sending multiple requests when the temporary slice is unavailable.

Figure 3:
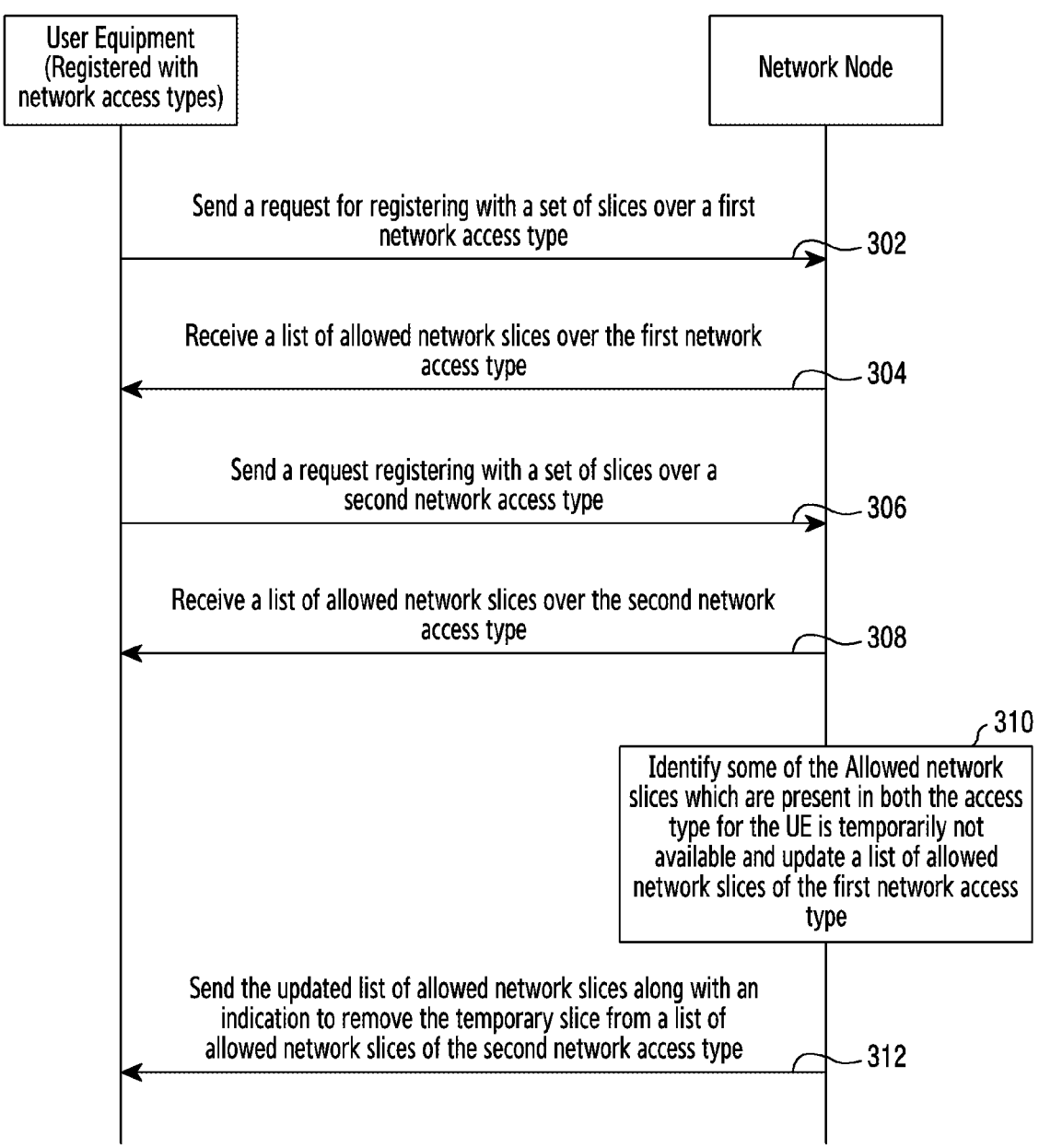
FIG. 3 illustrates a line diagram depicting network slice access management for a user equipment (UE) incapable of supporting temporarily available network slices, in accordance with the prior art.

FIG. 3 illustrates a line diagram depicting network slice access management for a user equipment (UE) 101 incapable of supporting temporarily available network slices, in accordance with the prior art.

The UE 101 may inform the network node 103 about the capabilities of the UE. In other words, the UE capability is an RRC signaling mechanism by which UE can inform its capabilities to the network node 103. Alternatively, the network node 103 may request UE to inform about its capability by sending a UE capability inquiry message and the UE responds to this request by sending UE capability information message. When the UE capabilities are not disclosed to the network node 103 and when the network node 103 receives a request from the UE for registering with a first set of slices over network access type such as 3GPP access type and non-3GPP access type as shown in step 302, then the network node may send a first list of allowed network slices to the UE 101 as shown in step 304. For instance, the network node 103 receives the request for registering with the first set of slices over the 3GPP access type. Based on the request received from the UE 101, the network node 103 may send the first list of allowed network slices to the UE 101. Further, the network node 103 may also receive the request registering with a second set of slices over other access types which may be over the non-3GPP access type. Then the network node 103 may send the second list of allowed network slices to the UE 101 as shown in step 306 and 308. Based on the transmission of the list of allowed network slices, the network node 103 may identify at least one network slice which is present in both the first and second list of allowed network slices (both the access types) for the UE 101 which is temporarily unavailable. When the allowed network slices are temporarily not available, then the network node 103 may update the first list of allowed network slices of the first network access type by removing the temporary slice from the first list of allowed network slices of the first network access type as shown in step 310. Upon updating the list of allowed network slices, the network node 103 may send an updated first list of allowed network slices of the 3GPP access type by removing the temporary slice from the second list of allowed network slices of the second network access type as shown in step 312. However, when the UE capabilities are disclosed by the UE to the network node 103, then the network node 103 may send at least one of time and location for the temporary slice to the UE 101 upon receiving the request for registering to the set of slices as shown in FIG. 2.

For example, when the network node 103 receives the request from the UE for registering with the set of slices, the UE 101 may send the initial request from the 3GPP access type. For instance, the UE 101 may request a service of network slices S1, . . . , S10. Based on the request from the UE 101, the network node 103 may send list of allowed network slices of S1, . . . , S10. Further, the UE may request the service of network slice S1, . . . , S7 which is accessing a video over non-3GPP. Then the network node 103 may send the list of allowed network slices to the UE over non-3GPP. As the UE 101 has requested for the network slice S1 . . . S7 over both 3GPP and non-3GPP, the network node 103 may identify at least one temporary slice (consider S1 for accessing a video) present in list of allowed slices of 3GPP and non-3GPP is temporarily unavailable. Then the network node 103 may update the list of allowed network slices of the 3GPP and may remove the network slice S1 which is accessing a video at 3GPP access type end. Thus, the list of allowed network slices over 3GPP may contain slices S2, . . . , S10 As there is removal of network slice S1, the network node may send the updated list of allowed network slices of 3GPP which also indicates that the removal of network slice S1 should be done at the non-3GPP access type end. As the temporary slice S1 in the above example is temporarily unavailable and temporary slice S1 is removed from both 3GPP and non-3GPP access types, the UE 101 may prevent transmitting the new request for temporary slice S1 as the UE is aware that the temporary slice is temporarily unavailable.

Figure 4:
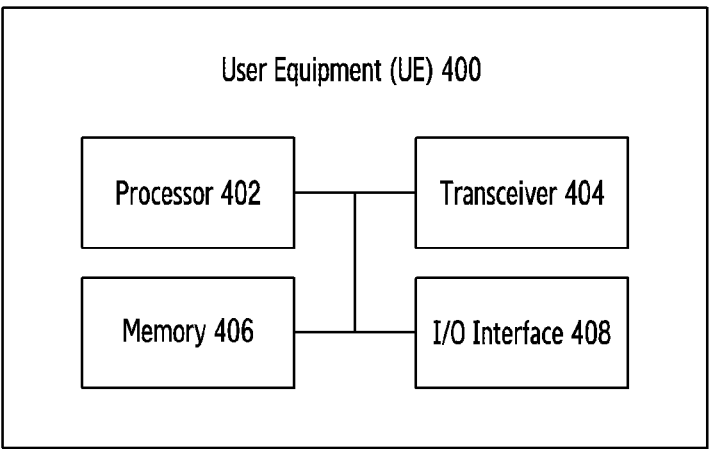
FIG. 4 illustrates a block diagram of a user equipment (UE) to handle network slice admission control, in accordance with an embodiment.

FIG. 4 illustrates a block diagram of a UE 400 to handle network slice admission control, in accordance with an embodiment. The UE may comprise various hardware components such as a processor 402, a transceiver 404, a memory 406 and an I/O interface 408 but is not limited thereto. The processor 402, the memory 406 and the I/O interface 408, may be communicatively coupled to each other via wired or wireless communication channels.

Further, the processor 402 may be configured to execute instructions stored in the memory 406 and to perform various processes. The I/O interface 408 may be configured for coupling the internal hardware components and with external devices via one or more networks. The memory 406 may also store instructions to be executed by the processor 402. The memory 404 may include a random-access memory (RAM) unit and/or a non-volatile memory unit such as a read only memory (ROM), optical disc drive, magnetic disc drive, flash memory, electrically erasable read only memory (EEPROM), a memory space on a server or cloud and so forth. The memory 406 may also store data processed by the processor 402 and a network slice admission controller and obtained via I/O interface 408.

When user equipment (UE) 400 is capable of supporting temporarily available network slices, the processor may send the request for registering with the set of slices over the first network access type to the network node. The first network access type may be at least one of 3GPP and non-3GPP. For instance, the UE may be registered with the network node over both network access types which may be 3GPP and non-3GPP. When the request is sent to the network node from the UE 400, the processor 402 may receive the policy related to the temporary slice. The policy may be independent of access types as the UE is registered with the 3GPP access type and non-3GPP access type, the received policy is applicable for both 3GPP access type and non-3GPP access type. As the received policy is applicable for 3GPP access type and non-3GPP access type, the processor 402 may prevent transmission of a new request to the network node for availing the service for the temporary slice over 3GPP access type and non-3GPP access type.

For instance, consider that the UE wishes to watch a football match and thus the UE may initiate the request for registering with the slice that may provide the needed service to the user. Upon receiving the request from the UE, the network node may check for the policy related with the temporary slice (say the slice responsible for rendering service of football match). Further, the UE may receive the policy related to the temporary slice. The policy comprises information of at least one of time and location for the temporary slice. For instance, the information about time may indicate that the service is available from 20 Jan. 2023 to 15 Feb. 2023. In an alternative embodiment, when the user wishes to avail or register for the service of viewing an online tutorial for which he has a subscription, in such scenarios the UE may send the request for registering with the set of slices for viewing the online tutorial. Based on the received request the network node may send the policy related to the temporary slice (video tutorial) according to this example. The policy may indicate a time duration for availability or unavailability of the temporary slice and the location indicates a coverage area serviced by the temporary slice. For example, the information about time may indicates that the service is not available for 3 hours on 31 Mar. 2023 due to maintenance activities. The location indicates a coverage area serviced by the temporary slice. Based on the received policy, the UE may prevent a new request to the network node for availing the service for the temporary slice.

Alternatively, when the UE 400 capabilities are not informed to the network node or when the UE is incapable of supporting temporary available network slices, the processor 402 may send a request for registering with the set of slices over 3 GPP and non-3GPP access types for which the UE may receive the first list of allowed slices over 3GPP and second list of allowed network slices over non-3GPP. In other words, the UE 400 may receive a list of allowed network slices independent of access types. Further, the processor 402 may receive an updated list of allowed network slices UE based on which the processor 402 may remove the temporary slice that is temporarily unavailable from the list of allowed network slices and prevent transmission of new requests to the network node from both 3GPP and non-3GPP access types. For ease of understanding consider that the processor may send the request with the first set of network slices and second set of network slices over 3GPP and non-3GPP, respectively. In response, the UE 400 may receive the first and second list of allowed network slices over 3GPP and non-3GPP, respectively. The list of allowed network slices is received over 3GPP and non-3GPP separately.

Further, the processor 402 may also receive an updated first list of allowed network slices which indicates to remove a temporary slice that is unavailable. As the temporary slice is unavailable over 3GPP and non-3GPP, the processor may also update the second list of allowed network slices and update the removed temporary slice from the list of allowed network slices. As the processor 402 is aware that the temporary slice is unavailable over both 3GPP and non-3GPP, the processor may prevent transmission of a new request to the network node for availing service for the temporary slice over any of the 3GPP and non-3GPP access types.

For example, when the network node receives the request from the UE 400 for registering with the set of slices, the UE 400 may send the initial request from the 3GPP access type. For instance, the UE 400 may request a service of network slices S1, . . . , S10. Based on the request from the UE 400, the network node may send list of allowed network slices of S1, . . . , S10. Further, the UE may request the service of network slice S1, . . . , S7 which is accessing a video over non-3GPP. Then the network node may send the list of allowed network slices to the UE over non-3GPP. As the UE has requested for the network slice S1, . . . , S7 over both 3GPP and non-3GPP, the network node may identify at least one temporary slice (consider S1 for accessing a video) present in the list of allowed slices of 3GPP and non-3GPP is temporarily unavailable. Then the network node may update the list of allowed network slices of the 3GPP and may remove the network slice S1 which is accessing a video at 3GPP access type end. Thus, the list of allowed network slices over 3GPP may contain slices S2, . . . , S10. As there is removal of network slice S1, the network node may send the updated list of allowed network slices of 3GPP which also indicates that the removal of network slice S1 should be done at the non-3GPP access type end. As the temporary slice S1 in the above example is temporarily unavailable and temporary slice S1 is removed from both 3GPP and non-3GPP access types, the UE may prevent transmitting the new request for temporary slice S1 as the UE 400 is aware that the temporary slice is temporarily unavailable.

FIG. 4 shows various hardware components of the UE 400, but it is to be understood that other embodiments are not limited thereon. In other embodiments, the UE 400 may include a lesser or greater number of components. Further, the labels or names of the components are used only for illustrative purposes and do not limit the scope of the disclosure. One or more components can be combined together to perform the same or substantially similar functions in the UE 400.

Figure 5:
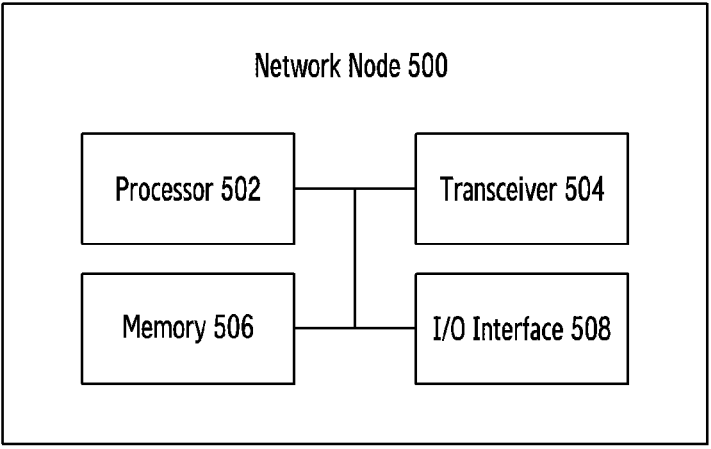
FIG. 5 illustrates a block diagram of a network node to handle network slice admission control, in accordance with an embodiment.

FIG. 5 illustrates a block diagram of a network node 500 to handle network slice access management for a UE incapable of supporting temporarily available network slices, in accordance with an embodiment.

The network node 500 may comprise various hardware components such as a processing unit 502, transceiver 504, memory 506 and I/O interface 508 but is not limited thereto. The processing unit may be communicatively coupled to the transceiver via wired or wireless communication channels. Further, the processing unit 502 may be configured to execute instructions stored in the memory 506 and to perform various processes.

The network node 500 may include a plurality of UEs associated with it as shown in FIG. 1. The network node 500 may receive requests from the plurality of UEs for availing the services. Initially the transceiver may receive a request for registering with a first set of slices over a first network access type. In response to the request received from the UE, the transceiver may send the first list of allowed network slices over the first network access type to the UE. For ease of understanding consider the first network access type to be 3GPP access type. Similarly, the transceiver may receive a second request for registering with a set of slices over a second network access type. In response to the request received from the UE 101, the transceiver may send the second list of allowed network slices over the second network access type (for instance, non-3GPP) to the UE. Upon sending the list of allowed network slices, the transceiver may identify that few allowed network slices from the plurality of allowed network slices which are present in both the access types are temporarily unavailable. As few allowed network slices are unavailable in both 3GPP and non-3GPP, the transceiver may update a first list of allowed network slices of the first network access type (3GPP) and may remove the temporary slice from the first list of allowed network slices of the first network access type (3GPP). The list of allowed network slices are updated in view of removing the temporary slice from the list of allowed network slices of the first network access type. Further, the transceiver may send the updated first list of allowed network slices to the UE along with an indication to remove the temporary slice from a second list of allowed network slices of the second network access type (non-3GPP).

The network node may also handle network slice access management for a UE 101 capable of supporting temporarily available network slices. The transceiver may initially receive a request for registering with the set of slices over 3GPP access type. Based on the received request from the UE, the transceiver may send the policy related to a temporary slice among the set of slices. The policy indicates information on location and time of the temporary slice. The time indicates a time duration for availability or unavailability of the temporary slice and the location indicates a coverage area serviced by the temporary slice. Based on the policy related to the temporary slice shared by the transceiver, the UE may prevent transmitting a new request to the network node for registering with the set of slices.

Although FIG. 5 shows various hardware components of the network node 500, it is to be understood that other embodiments are not limited thereon. In other embodiments, the network node 500 may include a lesser or greater number of components. Further, the labels or names of the components are used only for illustrative purposes and do not limit the scope of the disclosure. One or more components can be combined together to perform the same or substantially similar functions in the network node 500.

Figure 6:
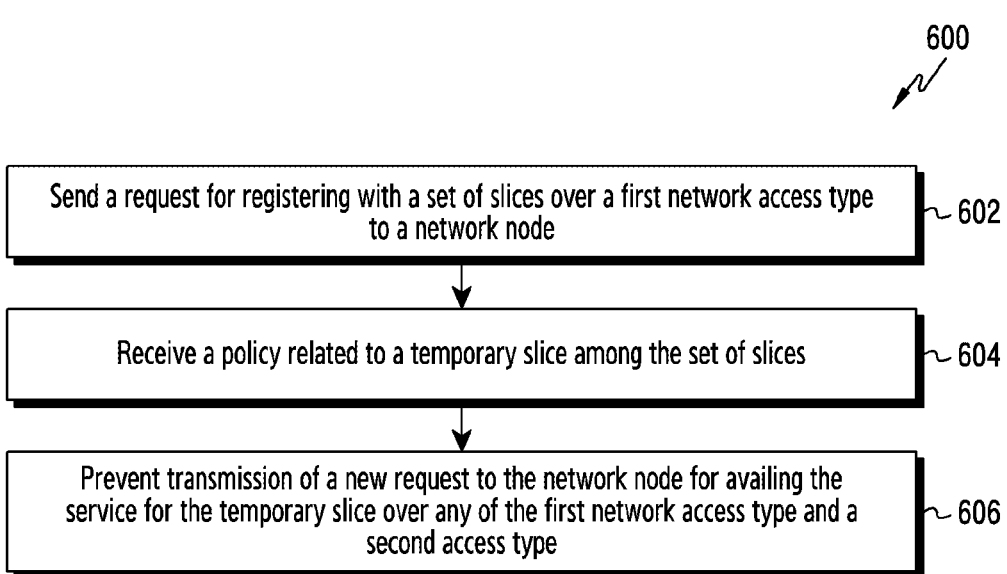
FIG. 6 illustrates a method of network slice access management for a user equipment (UE) capable of supporting temporarily available network slices, in accordance with an embodiment.

FIG. 6 illustrates a method 600 for handling network slice access management for a user equipment (UE) capable of supporting temporarily available network slices, in accordance with an embodiment.

Although example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of the UE implement the method 600 and may perform functions at substantially the same time or in a specific sequence.

According to some examples, the method 600 includes sending, by the UE, a request for registering with a set of slices over a first network access type to a network node at step 602. The first network access type may be at least one of 3GPP access type and non-3GPP access type. The method 600 further at step 604 recites receiving, by the UE from the network node, a policy related to the temporary slice among the set of slices. The received policy is applicable to both the first network access type and a second network access type. The policy comprises information of at least one of time and location for the temporary slice. The time indicates a time duration for availability or unavailability of the temporary slice and the location indicates a coverage area serviced by the temporary slice. The method 600 further at step 606 recites preventing, by the UE, transmission of a new request to the network node for availing the service for the temporary slice over any of first network access type and a second access type. When the policy is received at the UE end, the UE may store the received policy at the non-volatile memory of the UE until expiration of the time of the policy. For instance, the time duration may indicate that temporary slice is available for 2 months from 1 Apr. 2022 to 1 Jun. 2022.

Alternatively, when the user wishes to avail the service of viewing a reality show for which he has a subscription, in such scenarios the user may request registering with the set of slices for viewing the online tutorial. Based on the received request the network node may send the policy related to the temporary slice (reality show) according to this example. The policy may indicate a time duration for availability or unavailability of the temporary slice and the location indicates a coverage area serviced by the temporary slice. For example, the temporary slice which may not be available that is between 2-3 PM on Jan. 2, 2021 due to maintenance activity or may indicate the downtime of the temporary slice. Alternatively, the policy is stored at the UE even if the UE is deregistered from the network node or even if the UE is rebooted.

FIG. 7 illustrates an example method 700 of handling network slice access management for a UE incapable of supporting temporarily available network slices, in accordance with an embodiment.

Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components may implement the method 700 and may perform functions at substantially the same time or in a specific sequence. The methods disclosed herein describe how the network node handles network slice access management for a user equipment (UE) when the UE is incapable of supporting temporarily available network slices.

At step 702, method 700 receives, at a network node from the UE, a request for registering with a first set of slices over a first network access type. At step 704, method 700 sends by the network node to the UE the first list of allowed network slices over the first network access type. Further, at step 706, method 700 receives at a network node from the same UE, a request registering with a second set of slices over a second network access type. In response to the request from the UE, the network node may send the second list of allowed network slices over the second network access type at step 708. The first network access type and the second network access type are 3GPP access type and non-3GPP access type, respectively or vice-versa. Further, the method 700 includes identifying by the network node that at least one temporary slice present in both the first list of the allowed network slices and the second list of allowed network slices for the UE is temporarily unavailable at step 710. At step 712, the method 700 includes updating, by the network node, the first list of allowed network slices of the first network access type by removing the temporary slice from the first list of allowed network slices of the first network access type, in response to receiving the request from the UE. Further, at step 714 the method 700 includes sending, by the network node to the UE, the updated first list of allowed network slices along with an indication to remove the temporary slice from the second list of allowed network slices of a second network access type.

Figure 8:
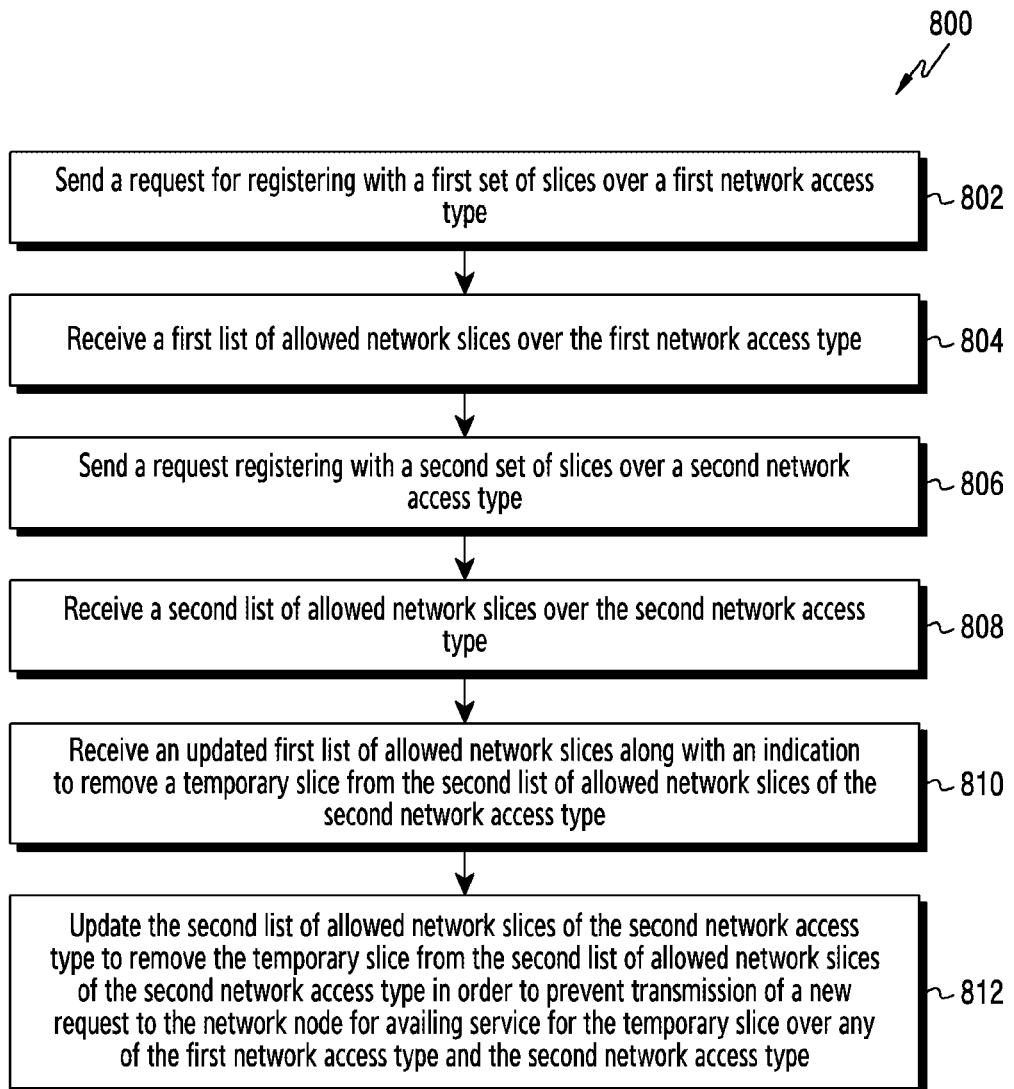
FIG. 8 illustrates method of network slice access management for a user equipment (UE) incapable of supporting temporarily available network slices.

FIG. 8 illustrates a method 800 of handling network slice access management for a user equipment (UE) incapable of supporting temporarily available network slices, in accordance with an embodiment.

Although method 800 depicts a particular sequence of operations, the sequence may be altered without departing from the scope of the present disclosure. For example, some of the operations depicted may be performed in parallel or in a different sequence that does not materially affect the function of the method 800. In other examples, different components may implement the method 800 and may perform functions at substantially the same time or in a specific sequence. The methods disclosed herein describe how the network node handles network slice access management for a UE when the UE is incapable of supporting temporarily available network slices.

At step 802, method 800 send, by the UE, a request for registering with a first set of slices over a first network access type. At step 804, method 800 discloses receiving, by the UE, a first list of allowed network slices over the first network access type. At step 806, method 800 describes sending, by the UE, a request registering with a second set of slices over a second network access type. In response to sending the request, the UE may receive a second list of allowed network slices over the second network access type at step 808. The first network access type and the second network access type are 3GPP access type and non-3GPP access type, respectively or vice-versa.

Further, the method 800 includes receiving, by the UE from the network node, an updated first list of allowed network slices along with an indication to remove the temporary slice from the second list of allowed network slices of a second network access type at step 810. Finally, the method includes updating, by the UE, the second list of allowed network slices of the second network access type to remove the temporary slice from the second list of allowed network slices of the second network access type in order to prevent transmission of a new request to the network node for availing the service for the temporary slice over any of the first network access type and the second network access type at step 812.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the detailed description.

The order in which the various operations of the methods are described is not intended to be construed as a limitation, and any number of the method described blocks or steps can be combined in any order to implement the method. Additionally, individual blocks or steps may be deleted from the methods without departing from the spirit and scope of the subject matter described herein. Furthermore, the methods can be implemented in any suitable hardware, software, firmware, or combination thereof.

It may be noted here that the subject matter of some or all embodiments described with reference to FIGS. 1-8 may be relevant for the methods and the same is not repeated for the sake of brevity.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in Figures, those operations may be performed by any suitable corresponding counterpart means-plus-function components.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include random access memory (RAM), read-only memory (ROM), volatile memory, nonvolatile memory, hard drives, compact disc (CD) ROMs, digital video disc (DVDs), flash drives, disks, and any other known physical storage media.

Certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise. The terms "including", "comprising", "having" and variations thereof, when used in a claim, is used in a non-exclusive sense that is not intended to exclude the presence of other elements or steps in a claimed structure or method, unless expressly specified otherwise.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope, which is set forth in the appended claims.

Various embodiments of the disclosure have been described above. The above description of the disclosure is merely for the sake of illustration, and embodiments of the disclosure are not limited to the embodiments set forth herein. Those skilled in the art will appreciate that the disclosure may be easily modified and changed into other specific forms without departing from the technical idea or essential features of the disclosure. Therefore, the scope of the disclosure should be determined not by the above detailed description but by the appended claims, and all modifications and changes derived from the meaning and scope of the claims and equivalents thereof shall be construed as falling within the scope of the disclosure.

What is claimed is:

1. A method performed by a user equipment (UE) in a wireless communication system, the method comprising:
   receiving, from an access and mobility management function (AMF) entity, temporary slice related information for a first single network slice selection assistance information (S-NSSAI);
   identifying that the first S-NSSAI is available or not available; and
   transmitting, to the AMF entity, a registration request message including a second S-NSSAI based on the identification,
   wherein the registration request message does not include the first S-NSSAI.

2. The method of claim 1,
   wherein the temporary slice related information includes S-NSSAI time validity information, and
   wherein the S-NSSAI time validity information is stored in a non-volatile memory.

3. The method of claim 1,
   wherein the temporary slice related information includes S-NSSAI location validity information, and
   wherein the S-NSSAI location validity information is stored in a non-volatile memory.

4. The method of claim 1,
   wherein a first access type for receiving the temporary slice related information is different from a second access type for transmitting the registration request message.

5. A method performed by an access and mobility management function (AMF) entity in a wireless communication system, the method comprising:
   transmitting, to a user equipment (UE), temporary slice related information for a first single network slice selection assistance information (S-NSSAI); and
   receiving, from the UE, a registration request message including a second S-NSSAI different from the first S-NSSAI,
   wherein the registration request message does not include the first S-NSSAI.

6. The method of claim 5,
   wherein the temporary slice related information includes S-NSSAI time validity information, and
   wherein the S-NSSAI time validity information is stored in a non-volatile memory of the UE.

7. The method of claim 5,
   wherein the temporary slice related information includes S-NSSAI location validity information, and
   wherein the S-NSSAI location validity information is stored in a non-volatile memory of the UE.

8. The method of claim 5,
   wherein a first access type for transmitting the temporary slice related information is different from a second access type for receiving the registration request message.

9. A user equipment (UE) in a wireless communication system, the UE comprising:
   a transceiver, and
   a controller coupled with the transceiver and configured to:
   receive, from an access and mobility management function (AMF) entity, temporary slice related information for a first single network slice selection assistance information (S-NSSAI);
   identify that the first S-NSSAI is available or not available; and
   transmit, to the AMF entity, a registration request message including a second S-NSSAI based on the identification,
   wherein the registration request message does not include the first S-NSSAI.

10. The UE of claim 9,
   wherein the temporary slice related information includes S-NSSAI time validity information, and
   wherein the S-NSSAI time validity information is stored in a non-volatile memory.

11. The UE of claim 9,
   wherein the temporary slice related information includes S-NSSAI location validity information, and
   wherein the S-NSSAI location validity information is stored in a non-volatile memory.

12. The UE of claim 9,
   wherein a first access type for receiving the temporary slice related information is different from a second access type for transmitting the registration request message.

13. An access and mobility management function (AMF) entity in a wireless communication system, the AMF entity comprising:

a transceiver, and a controller coupled with the transceiver and configured to:

transmit, to a user equipment (UE), temporary slice related information for a first single network slice selection assistance information (S-NSSAI), and receive, from the UE, a registration request message including a second S-NSSAI different from the first S-NSSAI, wherein the registration request message does not include the first S-NSSAI.

14. The AMF entity of claim 13, wherein the temporary slice related information includes S-NSSAI time validity information, and wherein the S-NSSAI time validity information is stored in a non-volatile memory of the UE.

15. The AMF entity of claim 13, wherein the temporary slice related information includes S-NSSAI location validity information, wherein the S-NSSAI location validity information is stored in a non-volatile memory of the UE, and wherein a first access type for transmitting the temporary slice related information is different from a second access type for receiving the registration request message.

* * * * *